United States Patent
Robert

(10) Patent No.: US 7,071,471 B2
(45) Date of Patent: Jul. 4, 2006

(54) DEVICE FOR DETECTING ELECTROMAGNETIC RADIATIONS

(75) Inventor: Patrick Robert, Reaumont (FR)

(73) Assignee: Societe Francaise de Detecteurs Infrarouges-Sofradir, Chatenay Malabry (FR)

( * ) Notice: Subject to any disclaimer, the term of this patent is extended or adjusted under 35 U.S.C. 154(b) by 257 days.

(21) Appl. No.: 10/721,648

(22) Filed: Nov. 25, 2003

(65) Prior Publication Data

US 2004/0113082 A1 Jun. 17, 2004

(30) Foreign Application Priority Data

Dec. 16, 2002 (FR) .................................. 02 15894

(51) Int. Cl.
*G01J 5/02* (2006.01)

(52) U.S. Cl. .................. 250/349; 250/252.1; 250/332; 250/338.1

(58) Field of Classification Search ................ 250/349, 250/252.1, 332, 338.1
See application file for complete search history.

(56) References Cited

U.S. PATENT DOCUMENTS 6,028,309 A 2/2000 Parrish et al. .............. 250/332
6,610,984 B1 * 8/2003 Knauth et al. .............. 250/352

* cited by examiner

*Primary Examiner*—David Porta
*Assistant Examiner*—Shun Lee
(74) *Attorney, Agent, or Firm*—Heslin Rothenberg Farley & Mesiti P.C.

(57) ABSTRACT

A device for detecting electromagnetic radiations implements a detection circuit associated with a reading circuit. The detection circuit includes an array of detection pixels, each comprising a thermal detector of biased bolometric type, and delivering an electric current signal representative of detected radiation. The signal undergoes a double baselining, respectively: a global baselining carried out by means of a thermally isolated bolometer, ensuring extraction from the signal, of a first current of constant value inherent to the biasing of the thermal detector, and an adaptive baselining specific to each of the pixels, carried out by a programmable current generator generating a current for subtraction from the current signal, as a function of the dispersion inherent to the pixel considered relative to a reference signal and stored in an associated memory integrated at the level of each of the pixels.

6 Claims, 5 Drawing Sheets

DEVICE FOR DETECTING ELECTROMAGNETIC RADIATIONS

BACKGROUND OF THE INVENTION

The invention relates to a device for the detection of electromagnetic radiations, and moreover to its visualization in analogue form.

Although the invention which follows is more particularly described with regard to the detection of infrared radiations, the present invention is also applicable to the field of the detection of visible or ultraviolet radiations.

The device of the invention implements thermal detectors of microbolometric type. Specifically, detectors of this type can operate at ambient temperature, that is to say without the need for cooling, in contradistinction to the device of the quantum detectors type, which directly convert the energy of the radiation captured into free electrical carriers.

This type of uncooled detector employs the variation of a property of one of the materials of which they consist as a function of temperature. Within the framework of the implementation of bolometric detectors, this property is the resistivity of the material. In a known manner, such an uncooled detector associated for each photosite or pixel comprises:

means of absorption of the radiation, for the conversion of the latter into heat;
means of thermal insulation of the detector, allowing the latter to warm up;
thermometry means, which, within the framework of a bolometric detector use a resistive element varying with temperature; and
means of reading electrical signals emanating from the thermometry means, the said reading means integrating a component for making contact and for transporting the signal from the bolometric material to a component for utilizing the signal, in general of microelectronic kind.

Within the framework of infrared imaging, the detectors employed are generally embodied in the form of arrays of elementary detectors laid on a substrate, usually consisting of silicon.

The implementation of such bolometric detection devices is not without the creation of problems of a technical nature.

Firstly, the performance of such an uncooled bolometric detector depends on various factors, including obviously the bolometric material employed.

Next, in order for these bolometric detectors to be able to operate, they need to be biased by a biasing current. Now, over an array of microbolometers, a dispersion is observed in the value of the nominal resistance of the various detectors, biased to the same constant voltage. A consequence of this dispersion is that the current for biasing the microbolometers is not uniform. Thus, a first solution to this problem has consisted in undertaking a global baselining, per column of pixels, carried out by means of a thermally isolated microbolometer.

Thus, represented within FIG. 1 is a schematic pixel (1) implementing a bolometric detector (2), biased by means of a voltage-driven transistor (3). The resistivity of the detector (2) is proportional to the amount of radiation that it receives, this being manifested as a variation in its bias current. This current emanates from a first baselining, the so-called global baselining, by means of a thermally isolated microbolometer (8) subjected to a constant baselining voltage V/Baselining. The expression thermally isolated is understood to mean a microbolometer whose resistivity is constant and independent of the radiation sensed. One also speaks of a blind microbolometer.

Also represented within this figure is the line (12) for row-wise selection of the pixel considered, acting on a switch (4), allowing the routing of the current resulting from the bolometric detector (2) to the level of a CTIA (11) (standing for the expression "Capacitive TransImpedance Amplifier"), charged with amplifying the said signal and with converting it into voltage via an integration capacitor (15), before its utilization for its restitution in the form in particular of video signals.

This global baselining induces the removal of the considerable dispersions of the bias current of the microbolometers (2), induced by the dispersions in the resistivity of the said detectors.

A consequence of the thermally isolated microbolometer (8) employed is that the current integrated by the reading circuit depends to the greatest possible extent on the infrared radiation or on the radiation detected, and not on the bias current.

Nonetheless, this so-called global baselining alone is not sufficient to obtain a satisfactory output signal. Specifically, given the mode of manufacture of detectors, bolometric detectors in particular, they are observed to exhibit dispersed values of resistance.

Thus, for a specified radiation and a specified integration capacitance, several microbolometers may reach the saturation zone situated outside the range of the dynamic swing of the input stage of the reading circuit. It has therefore been proposed that the global baselining device be supplemented with an additional device, called adaptive baselining, specific to each of the pixels of the array of the detection circuit, this amounting to improving the dynamic swing of the input stage.

This adaptive baselining function can be carried out by acting on the gate voltage of the microbolometer bias transistor VFID (see for example document U.S. Pat. No. 6,028,309).

In order to provide for this adaptive baselining function, it has also been proposed that for each pixel there will also be added a programmable current generator (9), which acts in parallel with the global bias current, generating a current for subtraction from the signal generated by the detector, as a function of the dispersion inherent to the pixels considered relative to a reference signal, and stored in an associated memory. In this case, a digital cue representative of the dispersion value for each of the pixels is stored outside the reading and detection circuit.

This pixel-wise adaptive baselining is carried out during the integration phase, that is to say the phase of acquisition of the image, by means of a programmable current source, also dubbed "baselining DAC" (DAC=digital analogue converter). The resolution of the DAC being 3 bits, it is necessary to store for each pixel the binary baselining value on 3 mapped bits.

This value is determined during a calibration phase that proceeds in the following manner:
a well-determined reference phase is presented to the array of detectors;
the baselining data provided to the circuit before integration are such that no baselining current is injected;
the reading and the analogue/digital conversion of the video signal emanating from this image are carried out by virtue of an analogue digital converter;
the 3 most significant bits of each pixel are stored in an external memory outside the reading circuit.

Thus, during the nominal operation of the circuit, each phase of integration of a row of the array is preceded by a phase of acquisition of the baselining data stored in the external memory for the row of pixels considered. The transferring of the data between the external memory and the reading circuit is performed sequentially on three digital inputs, that is to say that the 3 bits are programmed by bit/pixel of one and the same row.

If the implementation of such adaptive baselining proves satisfactory at the level of the quality of the signals thus detected, transcribed into analogue form, on the other hand, and this emerges very distinctly from the foregoing, it requires the implementation of an external memory, associated with the detection/reading circuit, thus to some extent complicating the electronics of the reading and detection circuit.

Furthermore, according to this process, the reading of the digital information representative of the three most significant bits specific to each pixel is performed during analogue integration by the said detectors, generating additional noise at the level of the reading circuit. This too emerges very clearly from the time chart representative of the baselining reading of the devices of the prior art, and represented in FIG. (2). This time chart corresponds to the schematic illustrated in FIG. 3. Thus, the three external-baselining data bits, previously stored in the external memory during the calibration phase, are transmitted sequentially to the reading circuit according to a tempo imposed by the pixel clock SYP. These data are stored temporarily in an internal buffer memory, called LATCH, which holds the baselining information for a complete row throughout the duration of integration. It therefore emerges that from a time chart point of view, the reading of the baselining data of row n is performed during the integration of row n−1 in a register with serial input and parallel output. At the end of the integration phase, the toggling of the synchronization signal to the high state (line SYL) triggers the transfer of the baselining data into the buffer memory LATCH, and the integration of row n can then commence, upon the toggling of the said synchronization signal SYL to the low state. There is therefore no immunity between the analogue processing and the digital processing of the signals at the level of the pixel and of the column to which it belongs, in particular in the memory writing phase.

A consequence of this is a degradation in the noise performance of the reading circuit, which has to remain compatible with the detector's own characteristic (lying between 250 μV and 500 μV).

In the schematic of FIG. 3, the external analogue digital converter (ADC) codes the video signal on three bits during the calibration phase. In this configuration, it is the electronics for driving the circuit that provide for the write/read management of the baselining data at the level of the external memory and of the reading circuit.

SUMMARY OF THE INVENTION

The object of the invention is to overcome these various drawbacks. It proposes in particular to integrate at the level of each pixel the memory necessary for storing the information cue specific to the dispersion of each of them relative to the reference signal.

Stated otherwise, the invention relates to a device for detecting electromagnetic radiations implementing a detection circuit associated with a reading circuit, the detection circuit consisting of an array of detection pixels, each of the said pixels consisting of a thermal detector of biased bolometric type, and delivering an electric current representative of the detected radiation, the said current being controlled by a double baselining, respectively:

a global baselining carried out by means of a thermally isolated bolometer, ensuring the extraction from the said electric current, of a first current of constant value inherent to the biasing of the said thermal detector;

an adaptive baselining specific to each of the pixels, carried out by means of a programmable current generator, specific to each of the pixels, generating a current for subtraction from the said current, as a function of the dispersion inherent to the pixel considered relative to a reference signal and stored in an associated memory.

It is characterized in that the said associated memory is integrated at the level of each of the said pixels.

This said, an analogue digital converter, and the adaptive baselining memory, actually making it possible also to integrate the management of the phases of calibration and reading of the baselining data are integrated at the level of the actual reading circuit.

This considerably simplifies the proximity electronics of the detection circuit. What is more, the phase of reading the data of each of the associated memories occurs between the end of the integration of a row n and the start of the integration of a row n+1.

The switchings in the pixel, related to the reading of the memory, are therefore not coupled with the sensitive phase of integration of the current by the so-called CTIA device, standing for the expression "Capacitive TransImpedance Amplifier", that is to say a column-extremity charge/voltage conversion device.

BRIEF DESCRIPTION OF THE DRAWING FIGURES

The manner in which the invention may be embodied and the advantages stemming therefrom will emerge better from the exemplary embodiment which follows given by way of nonlimiting indication in support of the appended figures.

DETAILED DESCRIPTION

Figure 4:
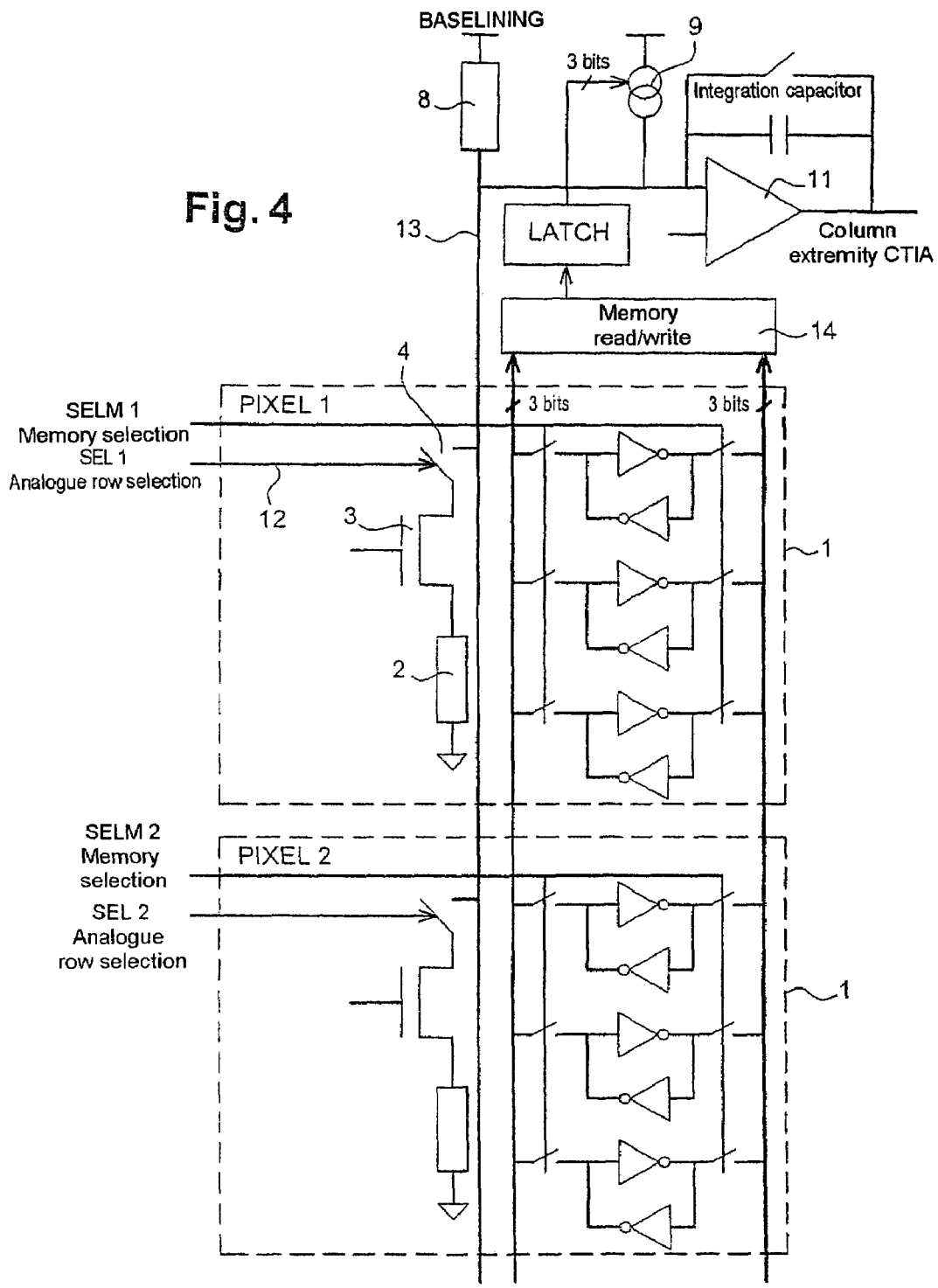
FIG. 4 is a representation of the schematic of the detector in accordance with the invention.
Figure 6:
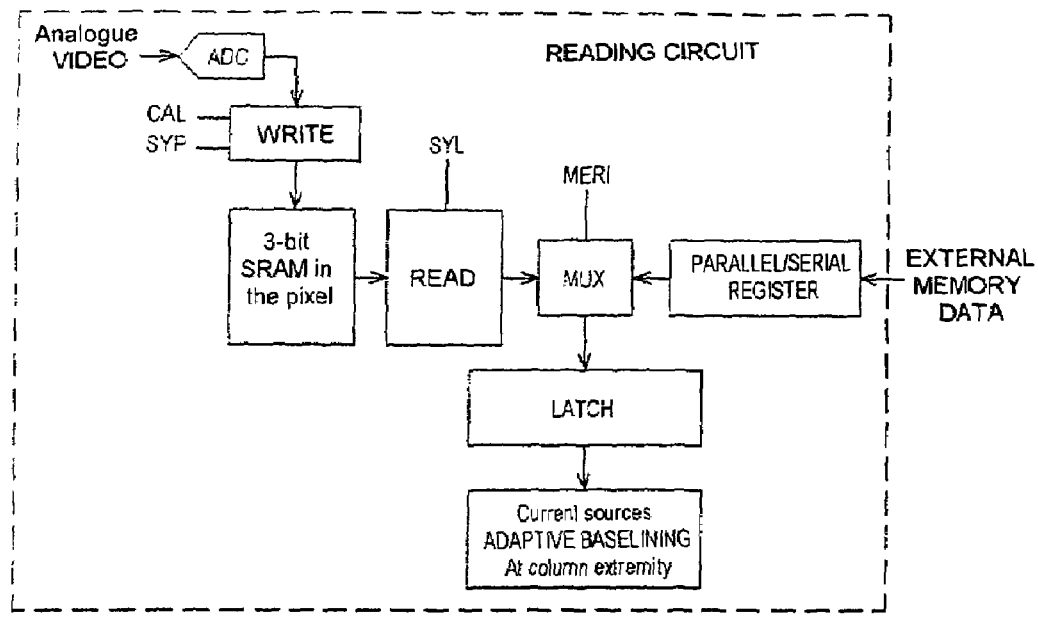
FIG. 6 is a diagrammatic representation of the device for reading of the integrated baselining memory.
Figure 7:
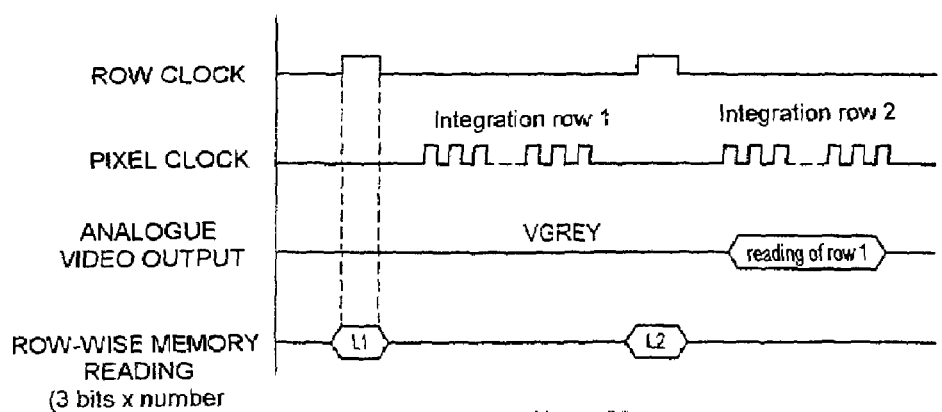
FIG. 7 is a time chart representative of the reading of the baselining memory.
Figure 8:
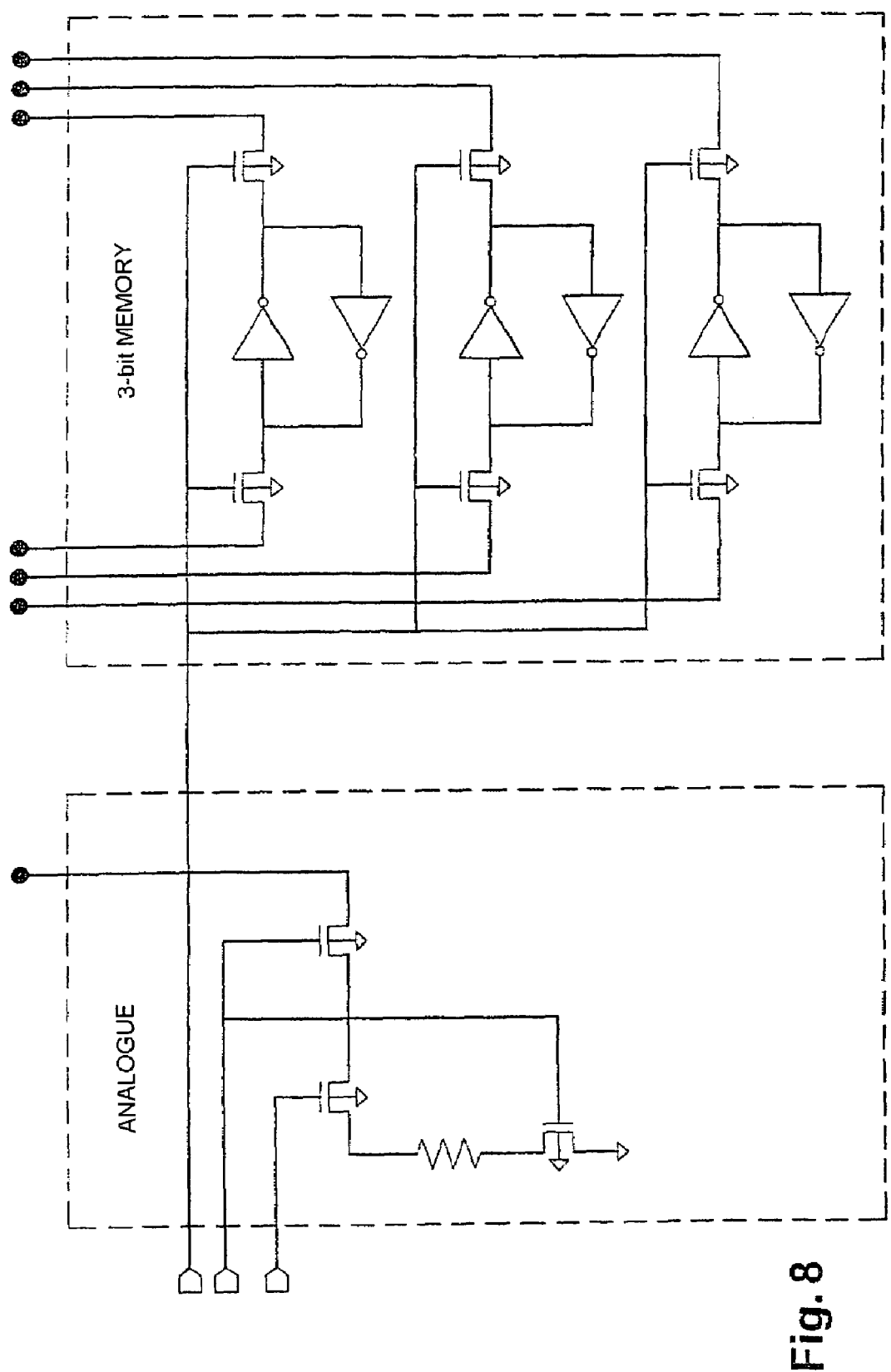
FIG. 8 is a representation of the electronic circuit implemented at the level of a pixel in accordance with the detection device of the invention.

A simplified schematic of a column of two pixels in accordance with the invention has therefore been represented, with regard to FIG. 4.

The various elements involved in these pixels have retained the same numerical references as those with regard to the figures of the prior art described earlier.

Fundamentally, the pixels have been represented by two broken-line rectangles. Each pixel integrates, in accordance with the prior art, a microbolometric detector (2), associated with a transistor (3), providing for the biasing of the detector. This transistor may be closed at (4) through the intermediary of an electrical signal sent by the reading circuit via a connection (12), therefore inducing closure on a baselining branch (13), which comprises, in a known manner, a thermally isolated microbolometer (8) exhibiting an almost zero thermal resistance relative to the thermal resistance of the detection microbolometer (2). This microbolometer (8) is subjected to a baselining voltage represented by the expression "V/BASELINING".

This baselining branch (13) delivers an electric current intended to be subtracted from the detection current emanating from the microbolometric detector (2), then processed by the reading circuit (not represented), in which the electric current is converted into a voltage by a current/voltage converter (11) situated at the column extremity.

Furthermore, and according to the invention, an adaptive baselining specific to each of the pixels is also implemented.

It consists in this instance of a programmable current generator (9), also generating a current for subtraction from the detection current emanating from the bolometric detector (2), and integrated at the level of the current/voltage converter (11).

This programmable current source, also dubbed baselining DAC, the initials DAC standing for "Digital Analogue Converter", has a resolution of three stored bits for each pixel in an associated memory.

According to a characteristic of the invention, these three bits are stored at the level of memories associated with each of the pixels, such as may be clearly observed in FIG. 4.

These memories typically consist of a head-to-tail inverter, of the static RAM memory type.

Stored in these memories are three most significant bits, representative of the dispersion of the output signal from the microbolometer (2) with which they are associated, and determined in the following manner.

A reference scene is presented to the array of pixels, the baselining data provided to the detection circuit before integration being such that no baselining current is injected.

The reading and the analogue digital conversion of the video signal emanating from this image are carried out by means of an analogue digital converter and the 3 most significant bits of each pixel are stored in the internal memories associated with each of the pixels.

The phase of reading the data is carried out between the end of the integration of a row n and the start of the integration of a row n+1.

Figure 1:
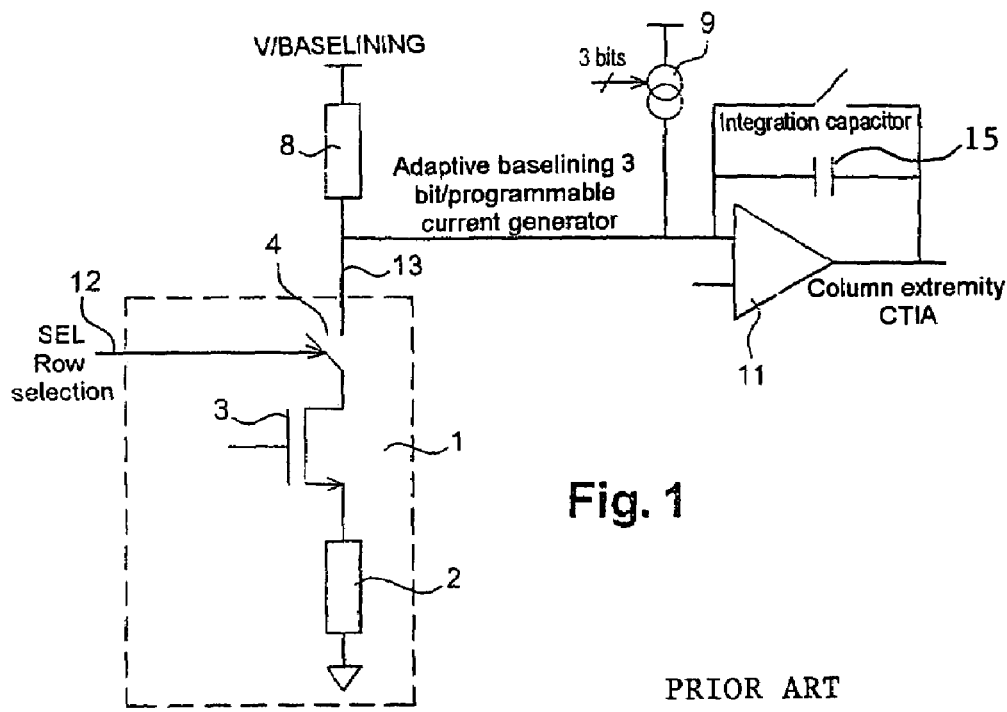
FIG. 1 represents the basic diagram of a microbolometric detector in accordance with the prior art.
Figure 2:
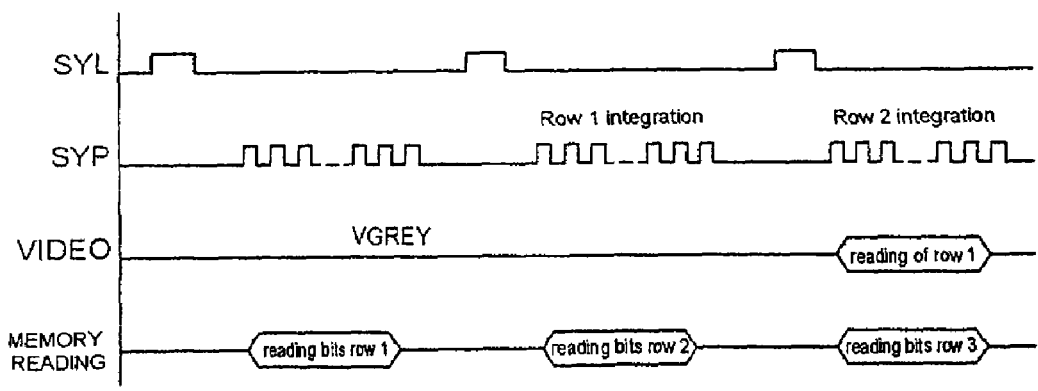
FIG. 2 represents a time chart representative of the implementation of the detector of the prior art.
Figure 3:
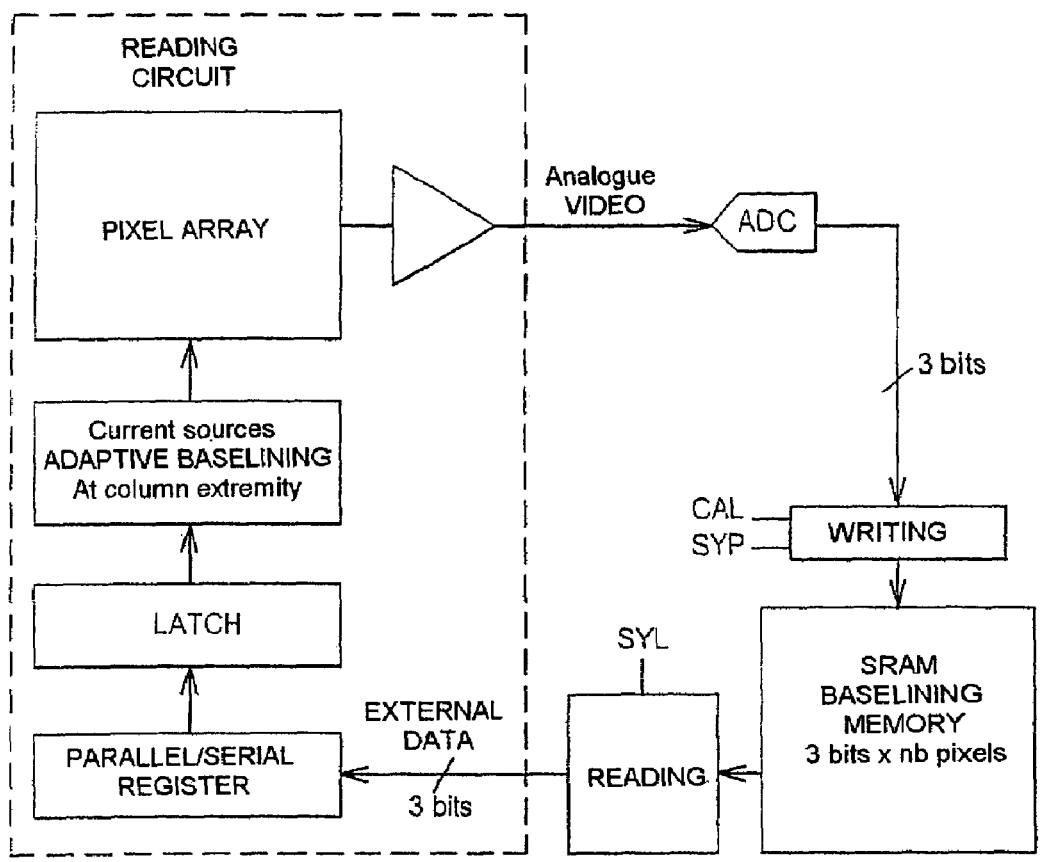
FIG. 3 is a general basic operating diagram for the detector also in accordance with the prior art.

The switchings in the pixel, related to the reading of the memory, are therefore not coupled with the sensitive phase of integration of the current by the end of column current/voltage converter. That said, this makes it possible to overcome the drawback related to the coexistence of analogue devices with signals of low amplitude and of low noise together with digital systems with signals of high amplitude generating disturbances that limit the performance of the circuit. The invention thus overcomes these phenomena by not carrying out any switching in the digital part during the phases of integration and of amplification of sensitive analogue signals. This is very clearly apparent moreover on comparative analysis of the time charts of FIGS. 2 (prior art) and 7 (invention): specifically, in the case of the prior art, and as already stated, the reading of the data of row n takes place during the integration of row n−1, while within the framework of the invention, the latter takes place between the phases of integration of row n−1 and of row n. The gain in terms of noise performance of the reading circuit thus proves to be significant.

Figure 5:
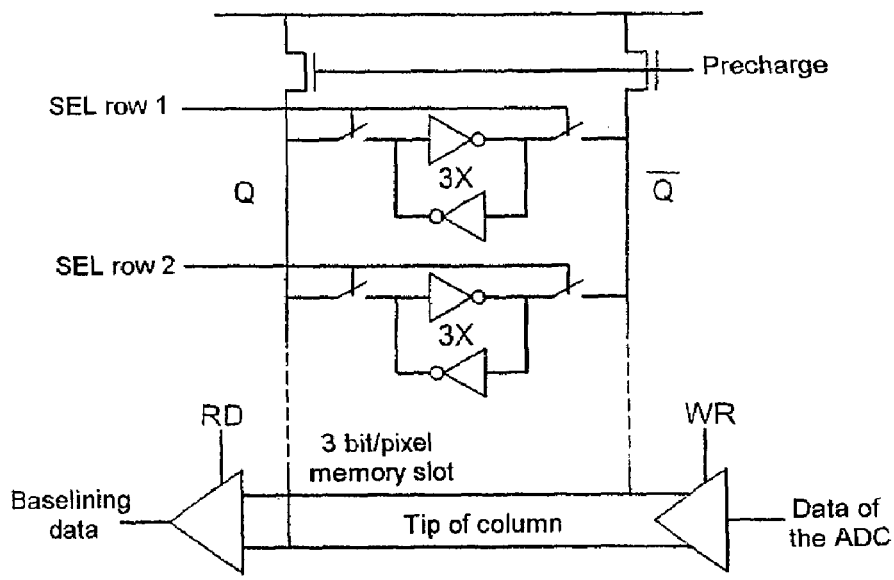
FIG. 5 is a simplified diagrammatic representation of the baselining memory integrated into the detection pixel, and associated with the reading and writing amplification device situated at the column extremity.

According to the invention, the internal memory, physically implanted at the pixel level, is row-wise and column-wise addressable with the writing and reading amplifiers situated at the column extremity (reference (14) in FIG. 4). The schematic of FIG. 5 depicts the row and column organization of the system in accordance with the invention. The memory slots at pixel level are row addressable by the logic signal SEL and the data are written or read at the column extremity via the reading and writing amplifiers, respectively controlled by the signals RD (read control) and WR (write control).

The following advantages emerge from the present invention:

The integration of the baselining memory into the surface of the pixel makes it possible firstly to simplify the circuit's drive electronics. It moreover makes it possible to improve the immunity to disturbances of the digital part of the circuit relative to the analogue part for reading and for shaping the electromagnetic signal detected, and in particular an infrared one.

The invention claimed is:

1. Device for detecting electromagnetic radiations implementing a detection circuit associated with a reading circuit, the detection circuit comprising an array of detection pixels, each of said pixels comprising a thermal detector of biased bolometric type, and delivering an electric current signal representative of detected radiation, said current signal undergoing a double baselining, respectively:
    a global baselining carried out by means of a thermally isolated bolometer, ensuring extraction from said electric current signal, of a first current of constant value inherent to biasing of the thermal detector, and
    an adaptive baselining specific to each of the pixels, carried out by means of a programmable current generator, specific to each of the pixels, generating a current for subtraction from said signal, as a function of dispersion inherent to the pixel considered relative to a reference signal and stored in an associated memory,
    wherein said associated memory comprises an internal memory physically implanted at a level of each of said pixels.

2. Device for detecting electromagnetic radiations according to claim 1, wherein a phase of reading data of each of memories associated with said pixels occurs between an end of integration of a row n and start of integration of a row n+1 of the array of said pixels.

3. Device for detecting electromagnetic radiations according to claim 1, wherein said electromagnetic radiations comprise infrared radiations.

4. Device for detecting electromagnetic radiations according to claim 1, wherein said internal memory is integrated into a surface of an associated pixel.

5. Device for detecting electromagnetic radiations according to claim 4, wherein said internal memory comprises a static RAM.

6. Device for detecting electromagnetic radiations according to claim 1, wherein said associated memory comprises 3 internal memories physically implanted with each pixel for storing 3 bits for each pixel.

* * * * *